Sept. 6, 1960  A. BENSON  2,951,606
STARCH TRAY
Filed June 23, 1958
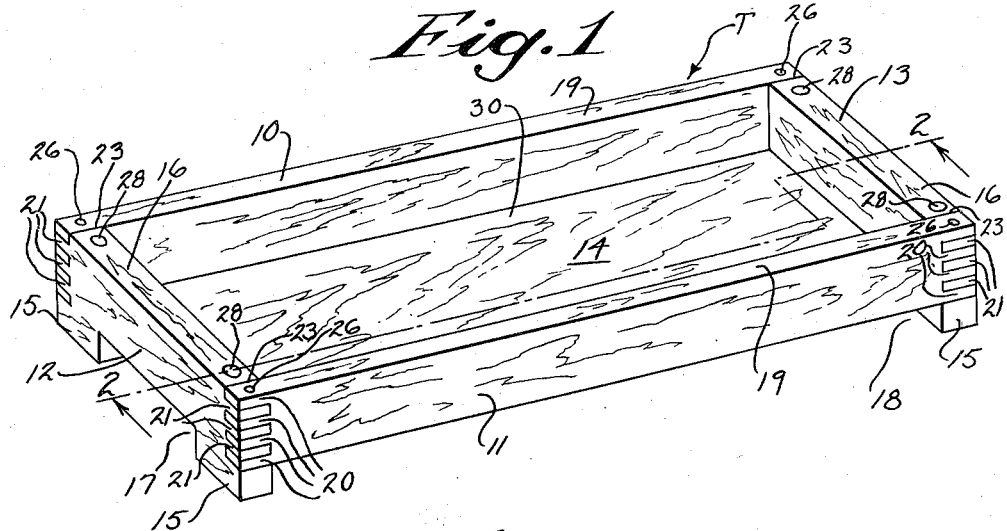
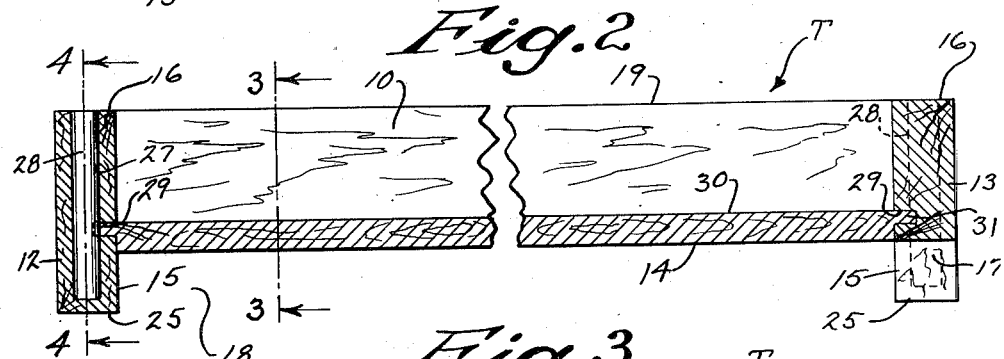
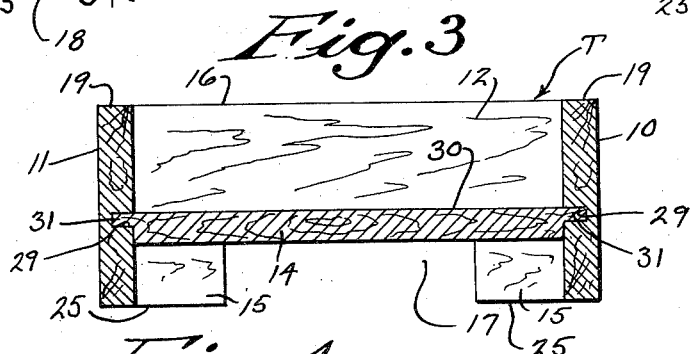
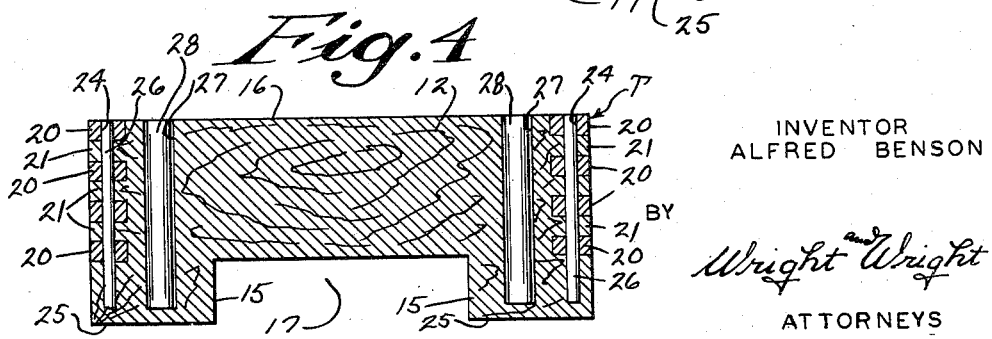
INVENTOR
ALFRED BENSON
BY
Wright and Wright
ATTORNEYS

United States Patent Office 2,951,606
Patented Sept. 6, 1960

2,951,606

STARCH TRAY

Alfred Benson, Stanley, Wis., assignor to Stanley Woodworkers, Stanley, Wis., a corporation Filed June 23, 1958, Ser. No. 743,944

1 Claim. (Cl. 217—65)

This invention appertains to trays and, more particularly, to a starch tray employed in the preparation of confections in the candy making industry.

In the manufacture of candy bars, confections and the like, it is the usual practice to provide a suitable depth of powdered corn starch in a tray and suitable impressions are formed in the starch providing molds which are then filled with the desired confectionery material in a soft state. These trays are moved by means of conveyors from one stage to another and quite often while the confection is hardening, the trays are removed from the conveyor and stacked one above the other so as to conserve space.

Sometimes during the movement of the starch trays on the conveyor, a tray may jam and if the tray is made of metal or the like material that does not give readily, this jam may cause serious damage to the conveyor machinery. It is highly desirable, therefore, to use a wooden tray in the industry since these wooden trays will not jam the machinery and are easier to manipulate and stack. It is necessary, of course, that these wooden trays be of a sturdy construction so that they will not splinter or break except under undue pressure and then it is desirable in the event of breakage, that no metal screws, nails, etc. be provided which may cause harm to machinery or get into the candy.

It is, therefore, a primary object of my present invention to provide a wooden starch tray which is of a sturdy construction, may be stacked one upon the other to provide ventilation and which is not apt to splinter, crack or break.

Another object of my present invention is to provide a wooden starch tray of sturdy construction in which no metal fastening devices are utilized whatsoever.

A further object of my invention is to provide a wooden starch tray of sturdy construction in which the bottom of the tray is securely joined to the side and end walls so that there are no loose cracks into which the starch or other such material may enter and which, therefore, is easy to clean.

Another salient feature of my invention resides in forming the feet of the tray in one piece and integral with the end walls of the tray and in strengthening the feet by the use of wooden dowels.

Another important advantage of my present device lies in joining the end and side walls by providing overlapping joints through which a wooden dowel is secured and which dowel also extends and is recessed in the feet of the end wall.

A further object of my present invention is to provide a simple, practical and reliable construction that is economical to manufacture, easy to assemble and not liable to get out of order.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawings, in which:

Figure 1 is an end elevational view in perspective showing my fully assembled starch tray;

Figure 2 is a longitudinal vertical section taken on the line 2—2 of Figure 1 and looking in the direction of the arrows and primarily illustrating the wooden dowels utilized for strengthening the integral feet of the end walls;

Figure 3 is a transverse sectional view taken on the line 3—3 of Figure 2 of the drawings looking in the direction of the arrows and showing details in the joining of the bottom to the side walls of the tray, and Figure 4 is a transverse sectional view taken on the line 4—4 of Figure 2 of the drawings looking in the direction of the arrows and again illustrating the wooden dowels utilized to strengthen the feet and the dowel and overlapping joint arrangement of the end and side walls.

Referring now to the drawings in detail wherein similar reference characters designate corresponding parts throughout the several views, the letter T generally indicates my improved starch tray and the same includes, broadly, side walls 10 and 11, end walls 12 and 13 and a bottom wall 14. The end walls 12 and 13 are each provided with a pair of supporting feet 15 and it should be obviously that by placing one tray on top of the other, the feet 15 will rest on the upper surface 16 of each respective end wall and that free circulation of air will be had through the spaces 17 and 18 formed between the bottom 14 and the upper surface of the end walls as well as the upper surface 19 of the side walls.

The salient feature of my invention resides in the novel construction of the starch tray and in the manner in which the various parts are joined together to eliminate metal fastenings and to form tight and strong joints. It should be noted that each side wall 10 and 11 is provided with a series of spaced tongues 20 which, obviously, form slots therebetween and that each side wall 12 and 13 is provided with aligned tongues 21 and forms spaced slots therebetween. The tongues 20 are received in the slots formed in the end walls and the tongues 21 of the end walls are aligned and received in the slots formed in the side walls 10 and 11. Each corner 23 is constructed in a similar and like manner and aligned apertures 24 are formed vertically through the tongues of both side walls and the end walls. Further, the hole drilled through the tongues to form the aperture is recessed within each foot 15 and terminates closely adjacent the under surface 25 of each foot. Firmly secured and received in said apertures is a wooden dowel 26. Inasmuch as the construction of each corner 23 is identical and similar, the above description relates merely to the description of one corner but it is understood that each corner 23 is identically formed. The dowel 26 is also preferably glued in place.

In order to further add strength and rigidity to the tray and to particularly strengthen each foot 15, a larger vertical bore 27 is drilled from the top surface 16 to terminate adjacent the lower surface 25 as shown more particularly in Figures 2 and 4 of the drawings and received therein is a larger wooden dowel 28. This dowel is likewise glued in position and it is obvious that should the foot 15 receive a blow sufficient to crack or break the same, the dowels 28 and 26 will serve to hold the foot to the tray so that it will not be apt to chip off or be broken entirely free of the tray.

On the inner periphery of each side wall 10 and 11 and each end wall 12 and 13 adjacent the lower ends thereof, I form a peripheral groove 29 and it should be noted that the bottom 14, about its outer periphery and adjacent its upper surface 30, is provided with an outwardly extending tongue 31 on the ends and sides thereof and the tongue 31 extends into the groove 29 and therefore provides a close tight fit eliminating all cracks and loose connections where dirt or other material can be collected.

From the foregoing it can be seen that I have provided a novel wooden starch tray which is sturdily built and thus keeps to a minimum splintering and chipping of the tray and in which the joints are so formed that no dirt can collect or build up thus facilitating the easy cleaning of the tray and further provides ample ventilation when the trays are stacked one above the other.

It is believed that the features and advantages of my invention will be readily apparent to those skilled in the art and it will, of course, be understood that minor changes in the form, proportion and details of construction may be resorted to without departing from the spirit of the invention or the scope of the appended claim.

I claim:

A rectangularly shaped wooden starch tray comprising, a bottom wall, side and end walls joined to said bottom wall, the end termination of each side and end wall having overlapping tongues and grooves to provide a tongue and groove joint at each respective corner of said tray, the inner and outer surfaces of said corner joints being flush and smooth, an aligned inner peripheral groove formed in said side and end walls intermediate the top and bottom thereof, an outer peripheral lip on said bottom wall of a size and configuration to be fitted tightly into said groove, integral depending feet formed on each end wall, said feet being spaced one from the other and one foot being positioned adjacent each end termination of said end wall and extending inwardly a substantial distance from said corner joint, wooden corner dowel pins extending through each tongue and groove joint into a respective foot and terminating short of the bottom surface thereof, and a second set of wooden dowel pins for said end wall, each being adjacent to and spaced from a respective corner dowel pin and extending into said respective foot.

References Cited in the file of this patent

UNITED STATES PATENTS

| | | |
|---|---|---|
| 304,113 | Locher | Aug. 26, 1884 |
| 510,761 | Baker | Dec. 12, 1893 |
| 706,763 | Lange | Aug. 12, 1902 |
| 1,608,702 | Lindblom | Nov. 30, 1926 |
| 1,930,988 | Townsend | Oct. 17, 1933 |
| 1,947,055 | Moorman | Feb. 13, 1934 |
| 2,530,481 | Rawn | Nov. 21, 1950 |